May 20, 1947.  M. R. BUFFINGTON ET AL  2,420,929
CHEVRON PACKING RING
Filed May 25, 1942
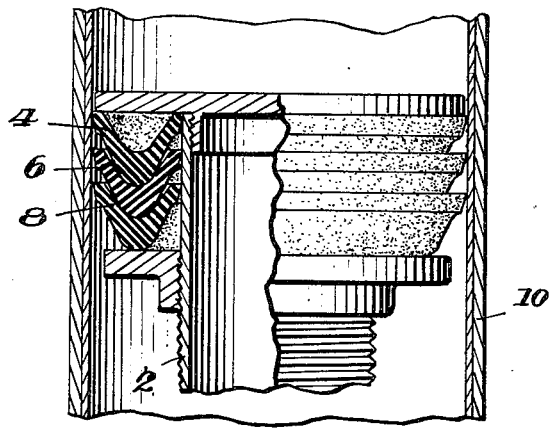
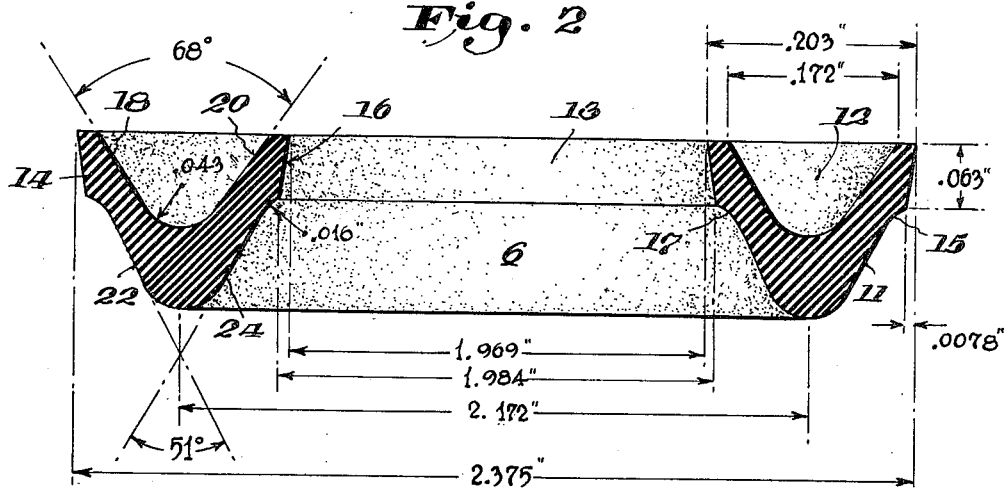
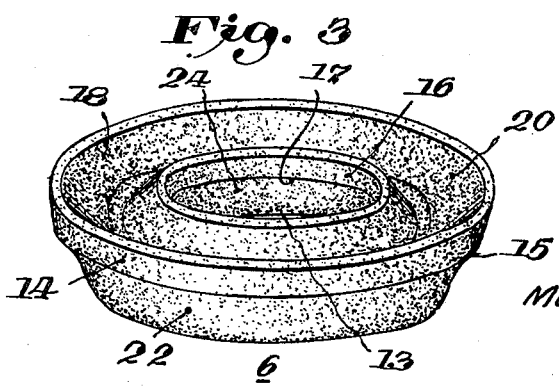
Inventors
Malcolm R. Buffington,
Emil G. Jegge,
By Aksel M. Pedersen
Attorney Patented May 20, 1947

2,420,929

UNITED STATES PATENT OFFICE 2,420,929

CHEVRON PACKING RING

Malcolm R. Buffington, Millburn, and Emil G. Jegge, Montclair, N. J., assignors to Lea Fabrics, Inc., Newark, N. J., a corporation of Delaware Application May 25, 1942, Serial No. 444,432

1 Claim. (Cl. 309—33)

The present invention relates to packings for pistons and similar moving elements and more particularly to chevron packings or V-packings in which a series of packing rings or packing units are nested together to function as a unit.

It is well known that considerable difficulty has been experienced in connection with chevron packings when mounted on a piston or moving element because of adherence or sticking to the walls of the cylinder or interior surface with which they are in contact.

Such sticking or adherence is particularly serious in some cases when it becomes impossible to move the piston element, as for example in connection with the hydraulically operated mechanism for retracting the under-carriage or landing gear of airplanes. Such sticking or adherence is also serious in connection with hydraulically operated mechanisms on submarines.

One of the objects of the present invention is to provide a form of chevron or V-packing which will not stick to the interior cylindrical surface in connection with which it is used.

Another object of the invention is to provide a composition for chevron packings which will withstand the corrosive action of mineral oil and other working fluids commonly employed in hydraulically operated mechanisms, particularly that for retracting the landing gear of airplanes, and which may be used in contact with a highly polished surface of a light metal, such as a magnesium alloy, without danger of jamming or scouring the surface.

Another object of the invention is to provide a form of structure for chevron packings which will permit the packing units to nest into each other without causing spreading of the under or supporting packing units and which will permit independent lip action or wiping action of each of the packing units in the series.

Another object of the invention is to provide a form of construction and composition for chevron or V-packings which may be readily molded into final form and which may be made at a relatively low cost of manufacture.

Another object of the invention is to provide a form of chevron or V-packing which may readily be made in any desired size and in a variety of compositions, varying in degree of hardness to provide any desired degree of flexibility and which is adapted to be reinforced with a fabric to produce increased stiffness but without affecting the softness of the outer surface which is to contact with a soft metal or alloy which would be scoured or scratched by the use of the ordinary compositions having the required degree of stiffness.

With these and other objects in view, the invention comprises the various features hereinafter more fully described and defined in the annexed claim.

It is generally known that ring packings of the chevron type, particularly in hydraulic mechanisms, stick to the working surface or cylinder wall after the hydraulic equipment remains unoperated for a substantial length of time. The results may be particularly serious when the hydraulic mechanism is relied on for operating on the retractable landing gear on airplanes or in connection with mechanisms on submarines.

The cause of the frequent sticking of chevron or ring packings of the forms heretofore used has not been understood, and in order to avoid the likelihood of sticking, extremely high working pressures have been used, which is also objectionable for the reason that with high working pressures, there is more likelihood of leakage of the hydraulic fluid.

It is believed that the sticking of the packing rings in hydraulic cylinders has been caused because of the particular form of the packing rings used, which when subjected to pressure in a cylinder adhere together as a single unit, transmitting pressure through the bodies of the packing rings and causing distortion thereof so that hydraulic fluid is squeezed out from between the contacting surface of the packing rings with the cylinder wall and producing in effect a partial vacuum in much the same way that a rubber vacuum cup adheres to glass or a smooth metal surface.

In the forms of chevron packing rings heretofore used, the angle between the sides of the outer convex annular surface of the ring is greater than the corresponding angle between the sides of the inner concave annular surface at the top of the packing ring, so that in nesting one packing into another, the bottom or convex portion of an upper packing spreads or expands the top or concave portion of the next packing ring below it in the series, so that the outer peripheral portions of the rings, or the lip portions thereof are caused to unite, and the main function of the lip portions, that of picking up fluid, is lost.

In accordance with the present invention, the chevron packing rings or units are made in a manner to permit firm seating engagement with the next lower and next upper rings in the series but permitting the side portions or lip portions of the packing ring to operate independently. To permit such operation, the side portions of the V are made so that the upper and lower surfaces of each ring converge outwardly toward the inner and outer peripheral lips, whereby when a series of rings are nested together, the outer and inner lip portions of adjacent rings diverge from the corresponding lip portions of the next adjacent ring, thus permitting the lip portions of each ring to move independently of the lip portions of the adjacent rings.

More specifically, the construction of the rings is such that the angle between the sloped sides of the concave annular portion is greater than the corresponding angle between the sloped sides of the convex annular portion, whereby when one ring is seated in or nested with another ring to form a series or chevron packing, the outwardly sloping side portions of the convex side of each ring remains out of engagement with the lateral surface of the concave annular portions of the ring next lower in the series. It will be apparent, therefore, that by means of the construction illustrated, the outer and inner lip annular portions of each ring remain out of contact with the corresponding lip portions of the adjacent rings in the series and operate independently against the adjacent cylindrical wall.

It will be apparent that in the use of the packing ring of our invention, as hereinafter more fully described, pressure may be transmitted through a series of packing rings without causing substantial distortion of the independently movable lip portions of the rings and without forcing the adjacent corresponding lip members together, whereby substantial sticking or adherence of the packing rings to the adjacent cylinder walls is avoided.

The various features of our invention are illustrated in the accompanying drawings showing the preferred embodiment of the invention, in which:

Fig. 1 is a cross sectional view in elevation showing a series of packing rings embodying the preferred form of the invention, the packing rings being shown in the nested relation mounted on a piston or plunger;

Fig. 2 is an enlarged cross sectional view in elevation through one of the packing rings; and Fig. 3 is a detailed view in perspective of one of the packing rings.

Referring more in detail to the drawings, the numeral 2 designates a piston or plunger of a piston-cylinder unit, such as may be employed in a hydraulically operated retracting mechanism for retracting the landing gear of airplanes.

Mounted on the piston 2 within a cylinder 10 are chevron or V packing rings 4, 6 and 8 which are shown nested in series. A second series of packing rings, not illustrated, may be mounted on the opposite end of the piston so as to extend in the opposite direction, the series being mounted in the usual manner.

Referring to Fig. 2 of the drawings, the packing ring members, as 6, are preferably constructed with a central opening 13 engaging the surface of the piston 2 on which it is mounted. The cross section of the ring is symmetrical at each side, having an annular outer lip portion 14 and a corresponding inner similar annular lip portion 16.

At the top portion of the packing ring as illustrated, the concave annular portion 12 of the ring is formed by symmetrically sloped sides 18 and 20 and the angle between the sloped sides 22 and 24 of the convex annular portion 11 may diverge at an angle less than that between the side portions 18 and 20 of the concave portion 12, so as to permit nesting of one ring against another without interfering with the free movement of the outer and inner peripheral portions 14 and 16 of the lip members. The lip portions 14 and 16 on both the outside and the inner side of the annulus are preferably sloped inwardly to a slight extent toward the base portion of the packing ring and merge in curved portions 15 and 17 with the corresponding convex side portions 22 and 24, thereby forming, in effect a reinforced comparatively rigid lip for contacting with the adjacent cylindrical surface.

The body portion of the piston ring is preferably constructed so that the lowermost portions of the angle in both the concave and convex surfaces are rounded, the radius of curvature of the upper and lower surfaces being substantially the same so as to permit nesting of the packing rings and to obtain intimate contact of the adjacent surfaces of the packing rings in the plane of the central portion of the cross sectional area thereof.

Referring to Fig. 2 of the drawings, showing the preferred embodiment of the invention, the cross section of each side or V of the packing ring may, by way of example, have an overall diameter of 2.375" and a total depth of about .172". The sides 18 and 20 of the upper or concave portion 12 may be disposed at an angle of about 68° with each other, for example, and may merge with each other in a curve or arc of a radius of about .043". The side walls 22 and 24 of the lower or convex portion 11 may diverge from each other in the cross-section to a less extent than those of the upper or concave portion and may form an angle, for example, of about 51°. The lip portions 14 and 16 may have a depth of about .065" and may be beveled inwardly about .0078". At the base or lower edge of the lip portions, on both the inner and outer peripheries of the annulus, the surface of the lip portions curves inwardly to merge with the sides 22 and 24 of the lower or convex surface, the curve being of about .016" radius with the dimensions as above set forth.

By means of the construction and the substantial proportions above described, the packing rings may be nested with each other and the adjacent packing rings contact at only the central or main body portion, so that the side portions and peripheral lip portions on both the outer and inner periphery of the annulus are free to move independently of the adjacent rings when nested in series. This construction prevents the transmission of pressure by the lip portions of the packing rings as a unit and avoids the sticking together of the lip members of adjacent packing rings and vacuum sucking of the lip portions against the surrounding cylindrical surface.

By means of this construction, the packing rings cannot be sufficiently distorted in form to transmit pressure longitudinally of the rings to bring the lip portions of adjacent rings together nor to transmit substantial pressure transversely through the rings to cause suction adherence to the cylinder walls. In other words, the lip portions of each of the packing rings operate entirely independently and fulfill their proper function of hydraulically sealing the cross section of the cylinder to take up the pressure of the hydraulic fluid, but without forcing the lip portions longitudinally together or causing transverse pressure engagement of substantial areas of contact with the adjacent cylindrical wall. It is clear that by means of this construction, sticking of the packing rings against the adjacent cylindrical surface is avoided to such an extent, at least, that the hydraulically operated mechanism may be operated or caused to function with relatively low pressures such as are preferably used in connection with hydraulic mechanisms.

While the form of the invention illustrated in Fig. 2 of the drawings is preferred in the ordinary construction of packing rings which are to be used particularly in connection with airplane, hydraulic equipment for operating the retractable under carriage, it will be understood that the form of the invention illustrated may be varied as will be apparent to those skilled in the art without departing from the spirit or scope of the invention as defined in the annexed claim.

The composition employed in making the packing rings of our invention may be varied depending on the size of the ring to be made and the flexibility desired in the lip portions of the packing rings. The composition may also be varied depending upon the type of hydraulic fluid with which the packing ring is to be in contact.

If the packing rings are to operate in water, ordinary vulcanized rubber may be employed, which may be reinforced with cotton or asbestos fabric, which is embedded in the rubber, if it is desired to increase the stiffness of the packing ring.

If the packing rings are to be used in contact with mineral oil, it is preferable to employ a vulcanizable composition of about 100 parts by weight of neoprene, 40 parts of carbon black, 5 parts of zinc oxide, 4 parts of magnesium oxide, 2 parts of Neozone D, as an anti-oxidant, and about 5 parts of cottonseed oil. This material may be introduced into a mold of the desired form and heated to a vulcanizing temperature for a suitable length of time to form the final product of the desired dimensions. After vulcanization, a neoprene compound of the composition above given has a hardness of about 70 when tested in a solid slab by the Shore hardness gauge.

It will be understood by those skilled in the art that the flexibility of the lip portions of the packing rings may be varied by varying the composition of the rubber mix to be vulcanized. It has been found that varying compositions adapted to give a hardness varying from about 50 to 85 by the Shore hardness gauge will provide suitable flexibility in the lip portions of the packing rings without forcing the lip portions into contact with the next adjacent packing ring in the series, whereby freezing or sticking of the packing rings may be entirely overcome.

If the packing rings are to be used in connection with a hydraulic fluid having solvent action on ordinary rubber, the rubber composition may be varied in known manner to reduce the solvent action. We may employ, for example, a base composition of rubber vulcanized into the desired final form of our invention, and then coat the packing ring with a thin coating of a mixture of neoprene and chlorinated rubber, which may be applied in the form of a liquid composition, using a suitable solvent in which the composition is soluble, the packing ring being dipped, for example, into the coating solution to provide the desired surface coating. The coating composition may be vulcanized by means of heat whereby the packing ring will resist the solvent action of the said hydraulic fluid.

It will be apparent that various changes in the form or structure of the packing ring of our invention and in the composition and flexibility thereof depending upon the particular use for which it is to be designed may be made without departing from the spirit or scope of the invention as herein described and as defined in the claim annexed hereto.

Having thus described the invention, what is claimed as new is:

A packing ring of the chevron or V type adapted to obviate freezing against a cylindrical working surface with which it is in contact which comprises a molded vulcanized rubber composition in the form of an annulus having a fabric reinforcement to provide substantial body stiffness with local surface flexibility, said packing ring being coated with a synthetic rubber composition to permit contact with a soft metal without producing scratching or scouring action, the said annulus including a body portion in which the lateral surfaces of the outer convex sides of the V cross section are disposed at an angle less than the corresponding lateral inner surface of the concave side, the V section having inner and outer lip portions converging outwardly in a direction away from the center of the section and beveled inwardly toward the center of the section, whereby in nesting a plurality of packing rings, the peripheral lip portions of each ring are movable independently of the lip portions of the next adjacent ring in the series.

MALCOLM R. BUFFINGTON.
EMIL G. JEGGE.

REFERENCES CITED

The following references are of record in the file of this patent:

UNITED STATES PATENTS

| Number | Name | Date |
|---|---|---|
| 2,284,340 | Nuckles | May 26, 1942 |
| 2,036,038 | Gottlieb | Mar. 31, 1936 |